US012116807B2

(12) United States Patent
Müller et al.

(10) Patent No.: US 12,116,807 B2
(45) Date of Patent: Oct. 15, 2024

(54) ANTI-THEFT DEVICE, IN PARTICULAR FOR CARDBOARD BOXES

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 287 days.

(21) Appl. No.: 17/507,460

(22) Filed: Oct. 21, 2021

(65) Prior Publication Data

US 2023/0131874 A1 Apr. 27, 2023

(51) Int. Cl.
*E05B 73/00* (2006.01)
*G08B 13/14* (2006.01)

(52) U.S. Cl.
CPC ...... *E05B 73/0029* (2013.01); *E05B 73/0017* (2013.01); *E05B 73/0047* (2013.01); *E05B 73/0052* (2013.01); *G08B 13/14* (2013.01)

(58) Field of Classification Search
CPC ............. E05B 73/0017; E05B 73/0023; E05B 73/0029; E05B 73/0052; E05B 73/0047; E05B 45/005; G08B 13/14; G08B 13/1445; G08B 13/1463
See application file for complete search history.

(56) References Cited

U.S. PATENT DOCUMENTS 1,124,130 A * 1/1915 Grant ..................... B65D 63/14 229/125.38
3,906,758 A 9/1975 Hurwitt
5,794,464 A * 8/1998 Yeager ................ E05B 73/0017 242/421
8,122,744 B2 * 2/2012 Conti ................. G08B 13/1463 70/57.1
9,169,670 B2 * 10/2015 Shute .................. E05B 73/0017
10,352,068 B2 * 7/2019 Hollis ................... E05B 67/006
2006/0130541 A1 6/2006 Tollefson
(Continued)

FOREIGN PATENT DOCUMENTS

WO WO-2009103179 A1 * 8/2009 ........... E05B 45/005

OTHER PUBLICATIONS

Espacenet, machine translation of WO 2009/103179 A1, generated Dec. 22, 2023. (Year: 2023).*
(Continued)

*Primary Examiner* — Kristina R Fulton
*Assistant Examiner* — Emily G. Brown
(74) *Attorney, Agent, or Firm* — Kilpatrick Townsend & Stockton LLP

(57) ABSTRACT

The invention relates to an anti-theft device configured to be attached to merchandise to be protected, preferably to cardboard boxes, the anti-theft device comprising a housing, which comprises a winding apparatus rotatably mounted therein, at least one securing-loop arrangement, the securing-loop arrangement being designed to loop around the merchandise to be protected such that the anti-theft device can be securely connected to the merchandise to be protected, and a winding apparatus locking mechanism configured to prevent the rotational unwinding movement of the winding apparatus in the housing, if the winding apparatus locking mechanism is engaged with the winding apparatus.

14 Claims, 6 Drawing Sheets

(56) References Cited

U.S. PATENT DOCUMENTS

Figure 1A:
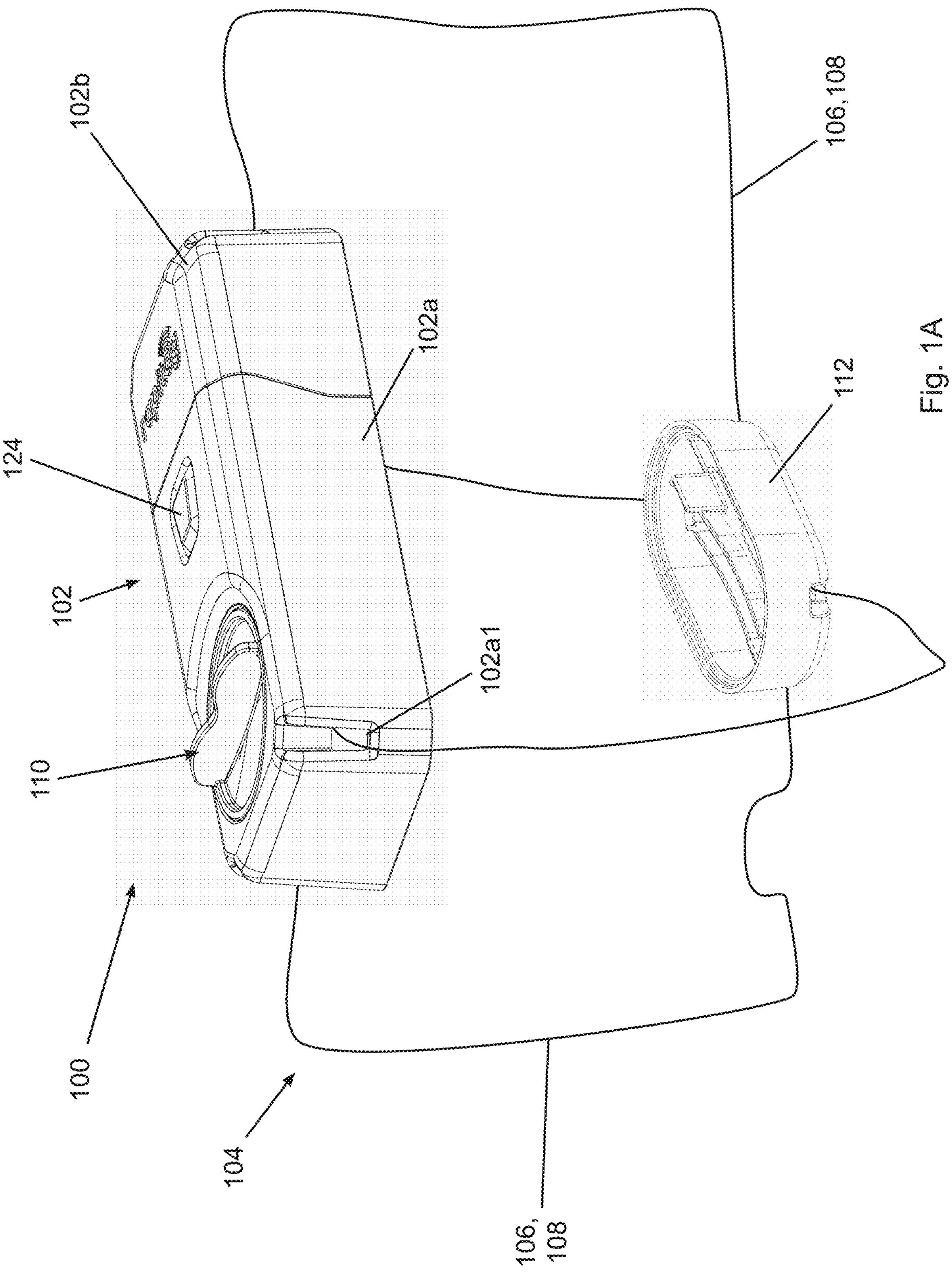

| | | | | |
|---|---|---|---|---|
| 2009/0223260 | A1* | 9/2009 | Conti | E05B 73/0029 70/57.1 |
| 2012/0227447 | A1 | 9/2012 | Conti | |
| 2016/0321884 | A1* | 11/2016 | Bremer | E05B 73/0041 |
| 2018/0340357 | A1* | 11/2018 | Carreon | E05B 73/0029 |
| 2020/0337162 | A1* | 10/2020 | Perkins | G04G 17/04 |

OTHER PUBLICATIONS

International Application No. PCT/EP2022/079392, International Search Report and Written Opinion mailed May 4, 2023, 21 pages.

* cited by examiner

ANTI-THEFT DEVICE, IN PARTICULAR FOR CARDBOARD BOXES

The invention relates to an anti-theft device configured to be attached to merchandise to be protected, preferably to cardboard boxes, the anti-theft device comprising a housing, which comprises a winding apparatus rotatably mounted therein, at least one securing-loop arrangement, which comprises one or more securing loops, each having at least one securing cord connected to the winding apparatus, the at least one securing cord being windable onto the winding apparatus in response to a rotational winding movement of the winding apparatus, and being unwindable from the winding apparatus in response to a rotational unwinding movement of the winding apparatus, the securing-loop arrangement being designed and intended to loop around the merchandise to be protected such that the anti-theft device can be securely connected to the merchandise to be protected, and a winding apparatus locking mechanism, which is engageable with the winding apparatus, the winding apparatus locking mechanism being configured to prevent the rotational unwinding movement of the winding apparatus in the housing, if the winding apparatus locking mechanism is engaged with the winding apparatus.

Anti-theft devices of this kind are well known and have been preferentially used for many years in the field of stores open to the public, as they provide sufficient protection against unauthorized removal from the store, or from or a demarcated sales area within said store, of merchandise sold therein. For this purpose, appropriate detector units are usually provided at all entrances and exits of the store, or of any demarcated sales areas therein, and these are designed and intended to emit an acoustic and/or visual warning signal if a customer attempts to remove any protected merchandise to which an anti-theft device of this kind is attached from the store or sales area without authorization, i.e., without paying for it beforehand.

To attach a generic anti-theft device to, for example, a substantially cuboidal cardboard box, which generally forms packaging for a product to be protected, a housing of the anti-theft device is usually first placed on one side of the cardboard box while at the same time one or more securing loops connected to a winding apparatus of the anti-theft device are arranged so as to loop around the cardboard box. Subsequently, the winding apparatus rotatably arranged in the housing of the anti-theft device is rotated in a rotational winding movement of the winding apparatus until such a point as the loop arrangement and the housing of the anti-theft device closely abut the cardboard box such that the anti-theft device is securely connected to the cardboard box.

Lastly, the anti-theft device is locked by the winding apparatus locking mechanism in such a way that an unwinding rotational movement of the winding apparatus is prevented such that the anti-theft device cannot be removed without authorization. Usually, the anti-theft device is not to be removed until after a sale of the merchandise protected by the anti-theft device is complete.

All of the aforementioned statements also apply to the anti-theft device according to the invention.

However, there are cases, in which the unlocking of the winding apparatus locking mechanism may be difficult, because a tensile force acting on the securing cord and thus also on the winding apparatus locking mechanism via the winding apparatus may lead to jamming or blocking of movable parts of the winding apparatus locking mechanism. This may be particularly disadvantageous, if the winding apparatus locking mechanism is to be operated by an automatically operating actuator, as in said case of jamming or blocking of movable parts of the winding apparatus locking mechanism the removing of the anti-theft device may be not possible or at least significantly complicated.

The object of the present invention is therefore to provide an anti-theft device that is improved in this regard.

According to a first aspect of the present invention, this object is achieved by an anti-theft device of the abovementioned type, the anti-theft device further comprising a further locking mechanism associated with the housing, the further locking mechanism having an unlocked state, in which the anti-theft device is detachable from the merchandise to be protected, and an locked state, in which the anti-theft device is fixedly connectable to the merchandise to be protected, wherein the further locking mechanism is operatively decoupled from the winding apparatus locking mechanism.

In the sense of the present invention, the term "operatively decoupled" particularly means that the operation of the winding apparatus locking mechanism is substantially independent of the operation of the further locking mechanism. As a result, for example, a tensile force acting on the securing cord and thus on the winding apparatus locking mechanism via the winding apparatus, has substantially no influence on the operation of the further locking mechanism and, in particular, the ability of the further locking mechanism to be transferred from the locked state into the unlocked state, and vice versa. As a further result, even if a high magnitude tensile force is acting on the securing cord and, thus, on the winding apparatus locking mechanism, the further locking mechanism can be operated as required, while tensile force-induced jamming or blocking of movable parts of the further locking mechanism can be prevented.

It is the merit of the inventor to have recognized that due to the provision of two separate locking mechanisms, namely the winding apparatus locking mechanism and the further locking mechanism, it can be achieved, on the one hand, a secure coupling of the anti-theft device with the merchandise to be protected via the winding apparatus locking mechanism, and on the other hand, a highly reliable locking and unlocking of the anti-theft device via the further locking mechanism.

At this point it should be mentioned that, in the context of the present invention, the anti-theft device may be configured such that after the further locking mechanism has been transferred into its unlocked state, the winding apparatus locking mechanism may be disengaged with the winding apparatus, so that the winding apparatus may perform rotational unwinding movement of the winding apparatus to enlarge the at least one securing loop of the securing loop arrangement and, thus, to detach the anti-theft device from the merchandise to be protected.

According to a development of the present invention the housing of the anti-theft device may further comprise a first housing part receiving the winding apparatus, and a second housing part, receiving the winding apparatus locking mechanism and the further locking mechanism, wherein in the unlocked state of the further locking mechanism, the first and the second housing part are disengageable from each other, so that the anti-theft device is detachable from the merchandise to be protected, and in the locked state of the further locking mechanism, the first and the second housing part are not disengageable from each other, so that the anti-theft device is securely connected to the merchandise to be protected. As a result, according to this embodiment it is possible to accommodate the winding apparatus, on the one hand, and the winding apparatus locking mechanism as well as the further locking mechanism, on the other hand, in separable parts of the housing of the anti-theft device. Thus, for example, to remove the anti-theft device from the merchandise to be protected, it is simply possible, to disengage the first and the second housing parts from each other. Therefore, the anti-theft device can be detached from the merchandise to be protected in a shorter period of time as compared to the generic anti-theft device, since the detachment can be done, after performing a small amount of the unwinding movement of the winding mechanism, simply by separating the two housing parts.

With respect to the latter embodiment, for example, the disengagement of the winding apparatus locking mechanism and the winding apparatus may be performed by the first housing part and the second housing part being moved by a certain amount relative to each other, in particular away from each other, after the further locking mechanism has been transferred into its unlocked state. As a result, the unwinding movement of the winding mechanism may be permitted, with the anti-theft device still being attached to the merchandise to be protected.

To ensure a secure and reliable engagement between the first housing part and the second housing part, if the further locking mechanism is in the locked state, the further locking mechanism may comprise a locking pawl arrangement including at least one locking pawl, which is configured to take a position, in which it engages with a corresponding recess formed in the first housing part, if the further locking mechanism is in the locked state. If desired, the locking pawl arrangement, may further comprise a biasing element, for example a spring or the like, such that the at least one locking pawl is biased to the position corresponding to the unlocked state of the further locking mechanism. As a result, the at least one locking pawl remains in the position corresponding to the unlocked state of the further locking mechanism until it is urged into a position corresponding to the locked state of the further locking mechanism. Further, to transfer the at least one locking pawl into a position corresponding to the unlocked state of the further locking mechanism, a movement of the at least one locking pawl only has to be released, to transfer the at least one locking pawl into the position corresponding to the unlocked state of the further locking mechanism by a biasing force of said biasing element.

According to a development of this embodiment, the locking pawl arrangement may further include a pair of locking pawls facing away from each other, which are configured to take a position, in which they engage with a corresponding pair of recesses formed in the first housing part, if the further locking mechanism is in the locked state. In this context, it is further preferred that the pair of locking pawls is connected via a biasing element, for example a spring or the like, such that the pair of locking pawls is biased to the position corresponding to the unlocked state of the further locking mechanism. As a result, at least the advantages end effects explained with respect to the last embodiment likewise apply to the development of this embodiment.

If the anti-theft device comprises the above-mentioned locking pawl arrangement, to ensure a particular reliable and stable form-fitting connection between the first and the second housing part, it is proposed that the at least one locking pawl or each locking pawl of the pair of locking pawls has a shape corresponding or similar to a dovetail joint.

To be able to transfer the further locking mechanism into the locked state in easy and comfortable manner, according to a further embodiment of the present invention, the further locking mechanism may comprise a locking button, which is configured to be operated by a user and to selectively take an operated position, which corresponds to the locked state of the further locking mechanism, and a non-operated position, which corresponds to the unlocked state of the further locking mechanism.

If the anti-theft device according to the invention comprises the above-mentioned locking button as well as the above-mentioned locking pawl arrangement, it is further proposed, that the locking button has an operating portion, which is configured to be operated by the user, and a functional portion, which is opposite to the operating portion and configured to engage with the locking pawl arrangement, such that the locking pawl arrangement is transferred to the position, which corresponds to the locked state of the further locking mechanism, if the locking button is in its operated position. As a result, a combination of the above-mentioned locking button as well as the above-mentioned locking pawl arrangement leads to both a secure coupling of the two housing parts and a an easy an comfortable operation of the further locking mechanism.

In principle the further locking mechanism may be transferred from the locked state into the unlocked state by any suitable device ensuring sufficient protection against unauthorized removal of the anti-theft device from the merchandise to be protected. However, according to a preferred embodiment of the invention, the further locking mechanism further comprises a release element, which is made at least in part of a shape-memory alloy and is configured to cause the further locking mechanism to be transferred from the locked state to the unlocked state when the shape-memory alloy is in an excited state. Shape-memory alloys are characterized by the fact that they can transmit very large forces in relation to their material volume while having a long service life over a large number of cycles. Accordingly, the release element can have a particularly compact design and preferably be accommodated entirely in the housing of the anti-theft device. In principle, both thermally and magnetically activatable shape-memory alloys can be used in accordance with the invention. In addition, since energy need only be supplied to excite the shape-memory alloy, the anti-theft device can be unlocked by a large number of unlocking devices, preferably contactlessly. Moreover, one and the same unlocking device can preferably be used to unlock different embodiments of the anti-theft device according to the invention If the anti-theft device according to the invention comprises the above-mentioned locking button and the last-mentioned release element, it is further preferred, that the further locking mechanism comprises a slide, which preferably is designed to be mounted translatable in the second housing part, wherein the slide is configured to be operatively connected to the release element as well as to the locking button, wherein the further locking mechanism is configured such that the locking button transitions from its operated position to its non-operated position, if the shape-memory alloy is in its excited state.

To be able to prevent the rotational unwinding movement of the winding apparatus in the housing, the winding apparatus locking mechanism may further comprise a first teething that is configured to be engaged with a second teething, which corresponds to the first teething and is fixedly coupled with the winding apparatus. In this context, the first teething may be formed on or fixedly coupled to the further locking mechanism. Similarly, the second teething may be formed on or fixedly coupled to the winding apparatus. According to a preferred embodiment the second teething may be formed on or fixedly coupled to an outer circumference of the winding apparatus, while the first teething may be arranged in the housing, preferably the second housing part, of the anti-theft device.

In principle, the winding apparatus locking mechanism of the anti-theft device according to the invention can be configured in such a way that, if the winding apparatus locking mechanism is engaged with the winding apparatus, both the unwinding rotational movement of the winding apparatus and the winding rotational movement of the winding apparatus are prevented. For this purpose, all that needs to be ensured is that the locking mechanism is never locked until the housing and the securing-loop arrangement already abut the merchandise to be protected so closely that the anti-theft device is securely attached to the merchandise to be protected. However, to make attaching the anti-theft device according to the invention to the merchandise to be protected even more convenient, according to a further preferred embodiment of the invention it is proposed that the winding apparatus locking mechanism is further configured so as to permit the rotational winding movement of the winding apparatus, even if the winding apparatus locking mechanism is engaged with the winding apparatus. This has the significant advantage that the further locking mechanism can be transferred to the locked state before, during or after the anti-theft device is attached at the merchandise to be protected.

With respect to the last-mentioned embodiment, the winding apparatus locking mechanism may further comprise a slip-through mechanism, which ensures the above-mentioned effect. If the further looking comprises the above introduced first teething, for example the first teething may connected with the second housing part via a further teething biasing element, in particular a teething spring, and the teething may be formed such that the rotational winding movement of the winding apparatus is permitted, while preventing the rotational unwinding movement of the winding apparatus.

In addition, to be able to ensure that the anti-theft device is only removed by authorized persons or only once the protected merchandise has already been paid for, in a development of the invention it is proposed that said anti-theft device further comprises an alarm generation apparatus configured to emit an acoustic and/or optical alarm signal in response to an attempt to remove the anti-theft device from the merchandise to be protected without authorization.

Improper removal of the anti-theft device when the further locking mechanism is in the locked state can, for example, involve severing at least some of the securing cords of the securing-loop arrangement such that the anti-theft device can be removed from the merchandise to be protected. To counter this circumstance, according to a particularly preferred embodiment of the anti-theft device according to the invention, the at least one securing cord of the securing-loop arrangement is made at least in part of an electrically conductive material and is preferably operatively connected to the alarm generation apparatus. For this purpose, the at least one securing cord can each be connected at both ends to the alarm generation apparatus such as to form a closed circuit. The alarm generation apparatus may further be configured such as to emit an alarm signal in response to a severing of the securing cords and a resulting breakage of this circuit.

It should also be noted that the anti-theft device may further comprise a signal-receiving unit, the anti-theft device being configured to cause the further locking mechanism to be transferred to the unlocked state when the signal-receiving unit receives a release-initiation signal, and/or a signal-transmitting unit, which is preferably configured to transmit a product information signal to a mobile terminal in response to a product-information request operation. The release-initiation signal may be intended for opening a single predetermined anti-theft device and/or for opening a plurality of predetermined anti-theft devices. The release-initiation signal is preferably an encrypted signal, which can in particular protect against unwanted tampering attempts and/or counteract unauthorized opening of the anti-theft device. The product information signal can include product-related and/or other information such as a price, in particular a customer-specific price, and/or an article/manufacturer name and/or availability information and/or similar other information relating to the merchandise protected by the anti-theft device.

According to a second aspect of the present invention, it is provided an anti-theft device of the abovementioned type, which can be preferably combined with the anti-theft device according to the first aspect of the invention, the housing of anti-theft device further comprising a first housing part receiving the winding apparatus, and a second housing part, receiving the winding apparatus locking mechanism, wherein in an unlocked state of the winding apparatus locking mechanism, the first and the second housing part are disengageable from each other, so that the anti-theft device is detachable from the merchandise to be protected, and in an locked state of winding apparatus locking mechanism, the first and the second housing part are not disengageable from each other, so that the anti-theft device is securely connected to the merchandise to be protected.

With respect to the advantages and effects of the anti-theft device according to the second aspect of the present invention, reference is made to the above explanations with respect to the anti-theft device according to the first aspect.

Furthermore, it should be noted that, by the anti-theft device according to the second aspect, it is possible to accommodate the winding apparatus and the winding apparatus locking mechanism in separable parts of the housing of the anti-theft device. Thus, for example, to remove the anti-theft device from the merchandise to be protected, it is simply possible, to disengage the first and the second housing part from each other. As a result, the anti-theft device can be detached from the merchandise to be protected in a shorter period of time as compared to the generis anti-theft device, since the detachment can be performed, after performing a small amount of the unwinding movement of the winding mechanism, simply by separating the two housing parts.

With respect to the second aspect it should be further noted, that the winding apparatus locking mechanism may also be combined with features described in the context of the further locking mechanism of the anti-theft device according to the first aspect. For example, according to the second aspect, the winding apparatus locking mechanism may be also associated with the housing and may selectively allow separating of the two housing parts and/or performing unwinding movement of the winding mechanism.

Figure 1B:
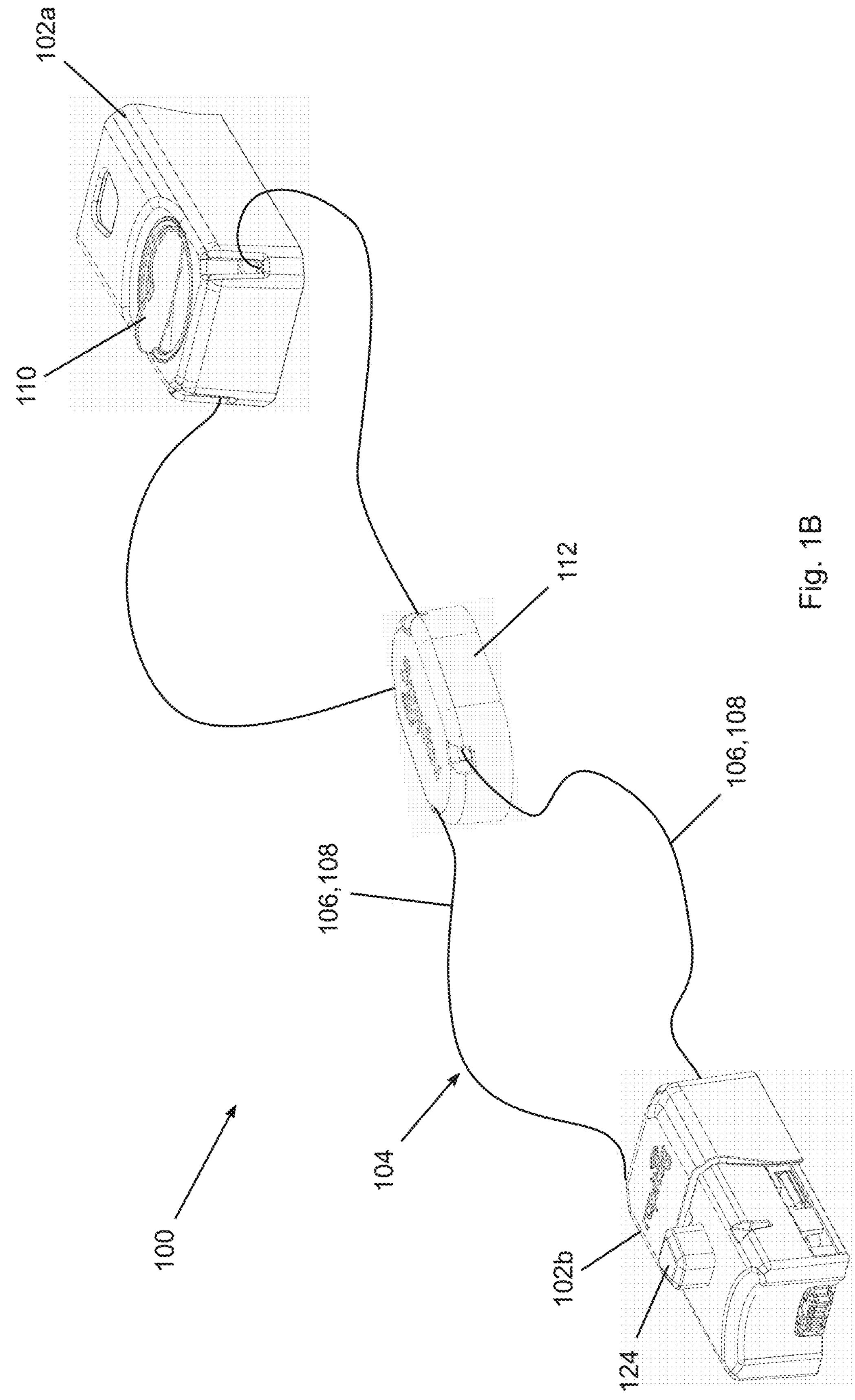
Figure 2A:
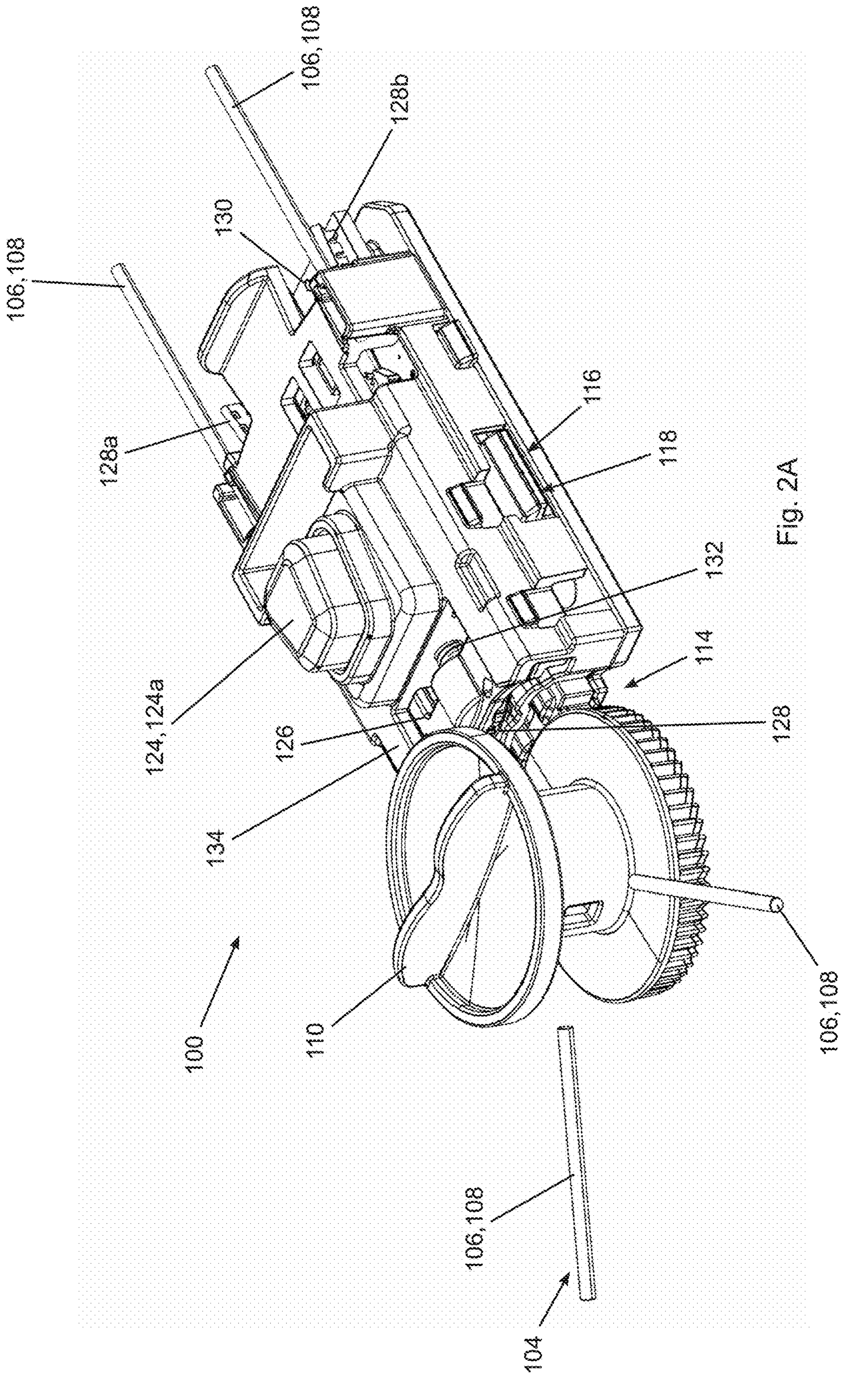
Figure 2B:
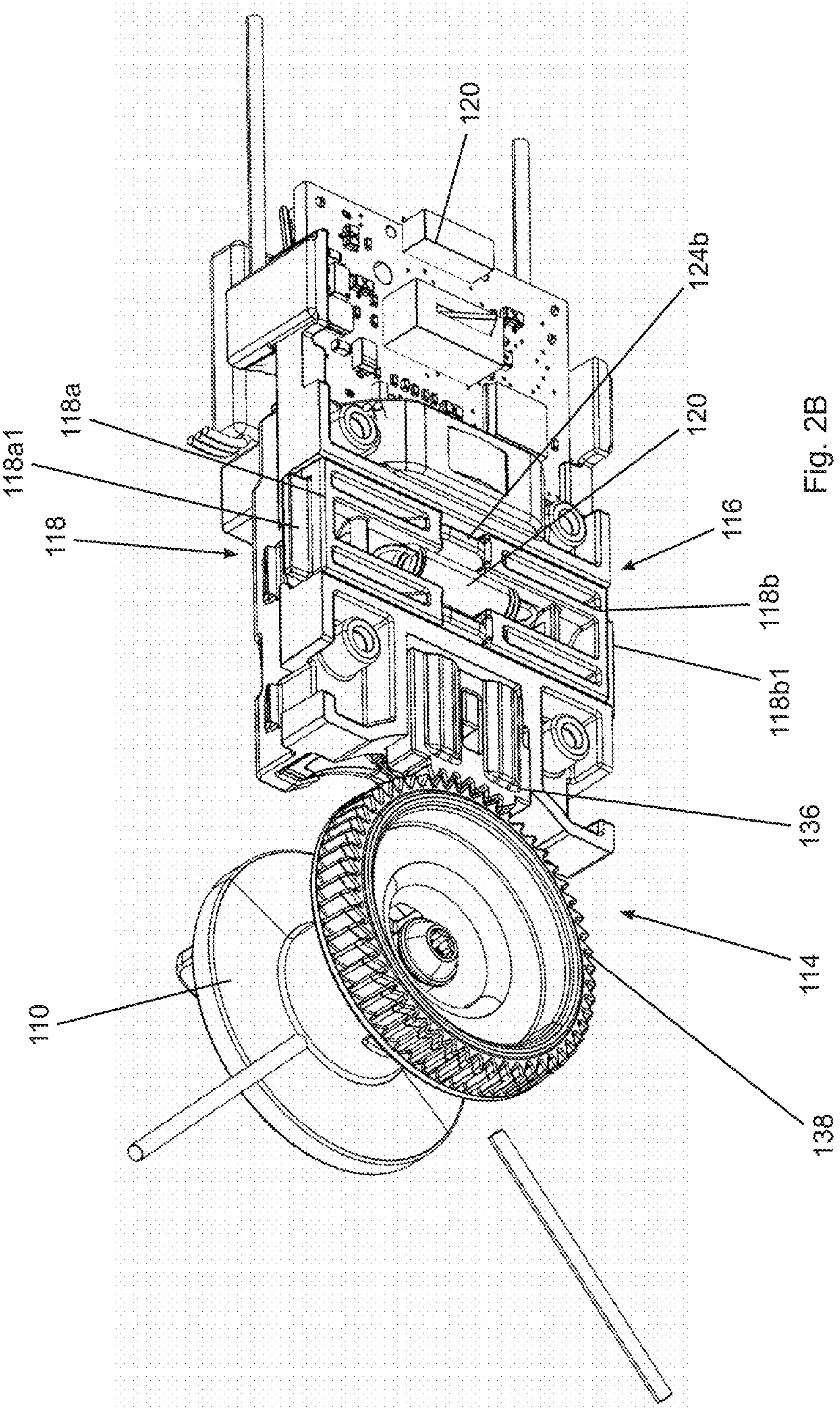
Figure 3:
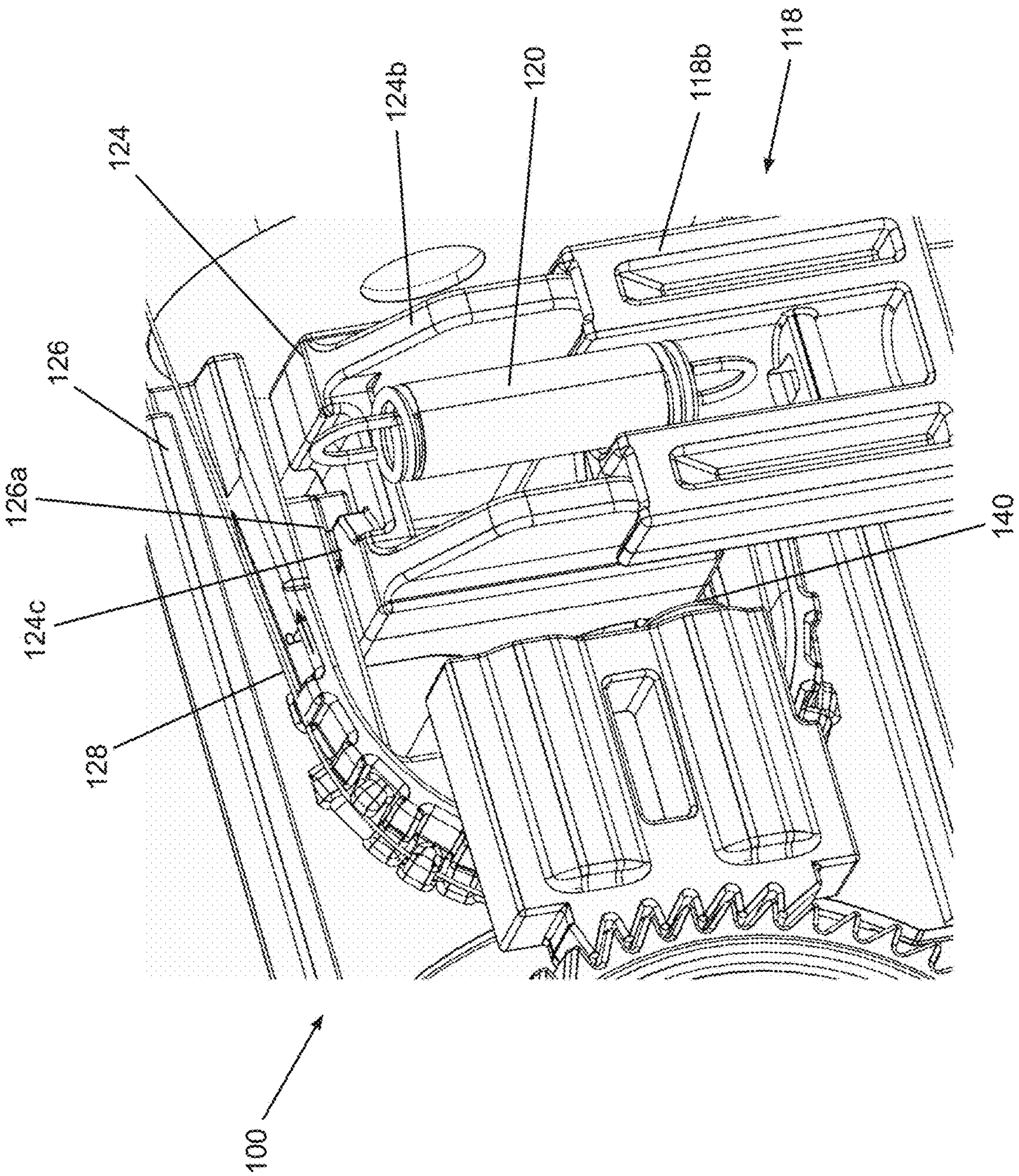
Figure 4:
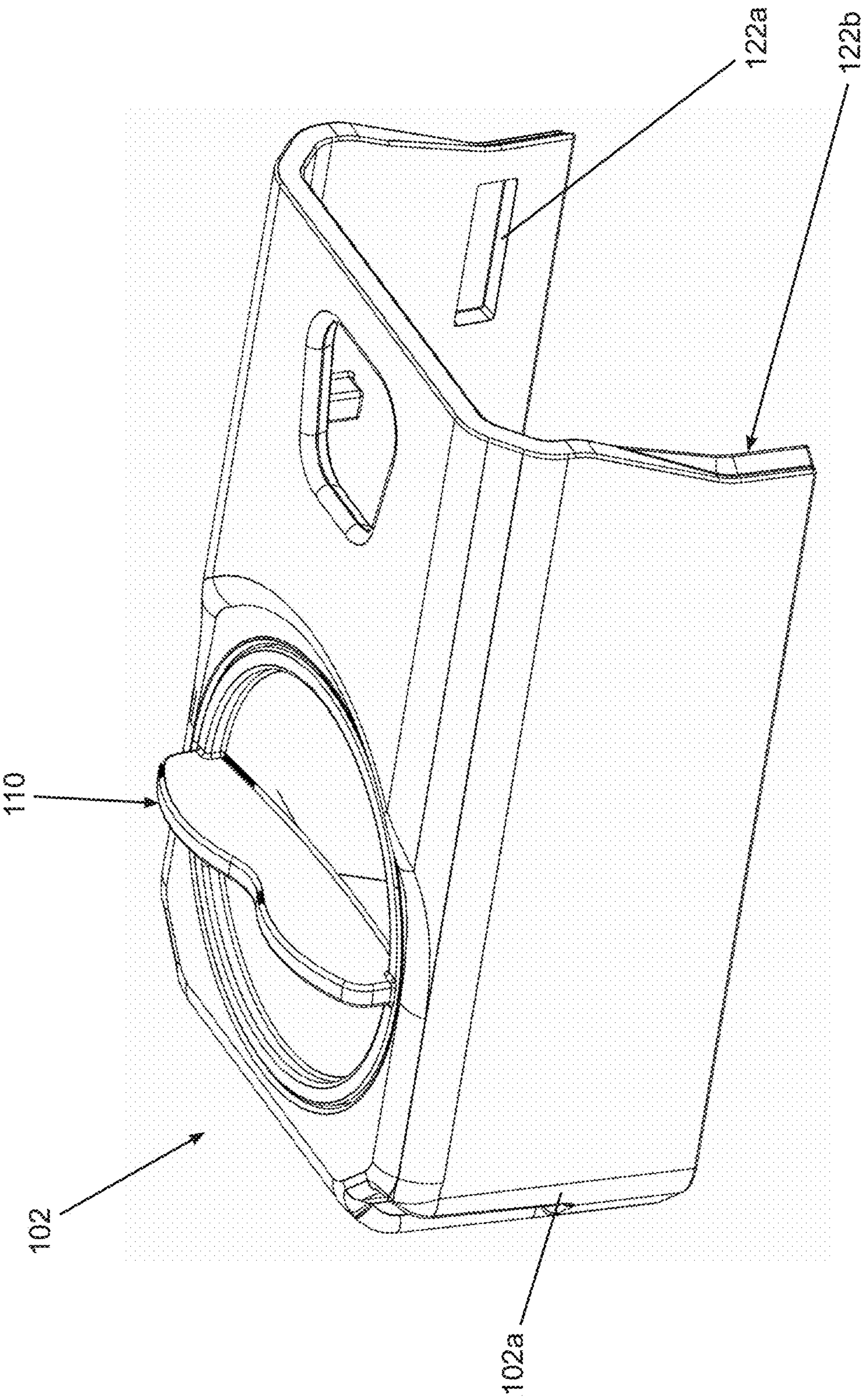

The invention will be described below in more detail on the basis of the accompanying drawings, in which:

FIG. 1A is a perspective view of an embodiment of an anti-theft device according to the invention in a state corresponding to the anti-theft device being attached to merchandise to be protected, FIG. 1B is a perspective view of the anti-theft device according to FIG. 1A, with a first housing part and a second housing part of a housing of the anti-theft device being separated from each other, FIG. 2A is a perspective view showing a winding apparatus locking mechanism and a further locking mechanism of the anti-theft device according to the embodiment, with the first housing part and the second housing part being omitted, FIG. 2B shows the winding apparatus locking mechanism and the further locking mechanism of FIG. 2A, but in a perspective view as seen from below, FIG. 3 shows a detailed perspective view of a part of the further locking mechanism shown in FIG. 2B, with one locking pawl of a pair of locking pawls being omitted, and FIG. 4 is a perspective view of a first housing part of the housing of the anti-theft device of the embodiment including a pair of recesses associated with the further locking mechanism of the anti-theft device.

In FIG. 1A an anti-theft device according to an embodiment of the present invention is generally indicated by reference sign 100. The anti-theft device 100 comprises a housing 102, which in the present embodiment is composed of a first housing part 102*a* and a second housing part 102*b*. Furthermore, the anti-theft device 100 comprises a securing loop arrangement 104, which comprises securing loops 106, wherein each securing loop 106 has one securing cord 108, which is connected to a winding apparatus 110 of the anti-theft device 100.

In FIG. 1A, the anti-theft device 100 is shown in a position corresponding to a state, in which the anti-theft device 100 is attached to merchandise to be protected (not shown in FIG. 1A). The merchandise to be protected, for which the anti-theft device 100 of the present embodiment is preferably intended to be used with, are for example cardboard boxes or the like. However, it should be noted at this point that the anti-theft device 100 according to the invention can be attached not only to cardboard boxes, but also to unpacked products, tools, crates or the like.

To facilitate the attachment of the anti-theft device 100, in particular the securing loop arrangement 104, the anti-theft device 100 may further comprise an anti-theft device counter element 112, which is connected to each securing loop 106 of the securing loop arrangement 104. In the present embodiment, each securing cord 108 of the securing loops 106 is guided through the anti-theft device counter element 112, so that a securing cord 106, which exits the first housing part 102*a* at an opening 102*a*1 of the first housing part 102*a* is guided through the anti-theft device counter element 112 and extended further to the second housing part 102*b*, to which it is preferably fixedly connected.

The winding apparatus 110 is mounted rotatably in the first housing part 102*a* so that the securing cords 108 are windable onto the winding apparatus 110 in response to a rotational winding movement of the winding apparatus, and are unwindable from the winding apparatus 110 in response to a rotational unwinding movement of the winding apparatus 110.

FIG. 1B now shows the anti-theft device 100 in a state, in which it is detached from merchandise to be protected. For this reason, the first housing part 102*a* and the second housing part 102*b* are separated from each other. However, to detach the anti-theft device 100 from merchandise to be protected, it is not necessarily required to separate the two housing parts 102*a* and 102*b* from each other, but it is also conceivable to perform the rotational unwinding movement of the winding apparatus 110 to an amount, which is sufficient to remove the merchandise to be protected through the securing loop arrangement 104 that is looped around the merchandise to be protected.

To prevent unauthorized detachment of the anti-theft device 100 from merchandise to be protected, the anti-theft device 100 of the present embodiment comprises a winding apparatus locking mechanism, which is engageable with the winding apparatus 110, and a further locking mechanism associated with the housing, in particular the two housing parts 102*a* and 102*b*, which will be described in more detail with reference to FIGS. 2A, 2B, 3 and 4.

In FIG. 2A, the anti-theft device 100 is shown with the two housing parts 102*a* and 102*b* of the housing 102 being omitted. Furthermore, for the sake of simplicity, in FIG. 2A, the securing cords 108 constituting the securing loops 106 of the securing loop arrangement 104 are shown only in some parts thereof.

According to the embodiment illustrated in FIG. 2A, the anti-theft device 100 comprises a winding apparatus locking mechanism 114, which is engageable with the winding apparatus 110, and configured to prevent the rotational unwinding movement of the winding apparatus 110 in the housing 102, in particular the first housing part 102*a*. Furthermore, in this embodiment, the anti-theft device 100 further comprises a further locking mechanism 116 having an unlocked state, in which the anti-theft device 100 is detachable from the merchandise to be protected, and a locked state, in which the anti-theft device 100 is fixedly connectable to the merchandise to be protected.

In the present embodiment, the further locking mechanism 116 is associated with the second housing part 102*b*. To be able to fixedly and securely engage the second housing part 102*b* with the first housing part 102*a*, the further locking mechanism 116 comprises a locking pawl arrangement 118.

As can be better seen from FIG. 2B, showing the further locking mechanism 116 from below, the locking pawl arrangement 118 comprises a pair of locking pawls 118*a* and 118*b*, facing away from each other. The pair of locking pawls is connected via a biasing element in the form of a spring 120, so that the pair of locking pawls 118*a* and 118*b* is biased to a position corresponding to an unlocked state of the further locking mechanism 116. To fixedly engage the first housing part 102*a* with the second housing part 102*b*, each locking pawl of the pair of locking pawls 118*a* and 118*b* comprises locking pawl projections, which are indicated by reference signs 118*a*1 and 118*b*1, respectively. In the present embodiment, the locking pawl projections 118*a*1 and 118*b*1 have a shape corresponding or similar to a dovetail joint, so that the locking pawl projections 118*a*1 and 118*b*1 are suitable to engage with a corresponding pair of recesses 122*a* and 122*b*, which are shown in FIG. 4, for example, which are counter-shaped to the locking pawl projections 118*a*1 and 118*b*1 and are formed on opposite sides within the first housing part 102*a*.

To transfer the further locking mechanism 116 from an unlocked state into a locked state, the anti-theft device 100 further comprises a locking button 124, which is configured to be operated by a user and to selectively take an operated position (as shown in FIG. 1A, for example), which corresponds to the locked state of the further locking mechanism 116, and a non-operated position (as shown in FIG. 1B, for example), which corresponds to the unlocked state of the further locking mechanism 116.

The interaction of the locking button 124 and the locking pawl arrangement 118 can be best seen from FIG. 3, in which, for a better understanding, the locking pawl 118*a* of the locking pawl arrangement 118 has been omitted. As can be seen from FIGS. 2A and 3, for example, the locking button 124 has an operating portion 124*a*, which is configured to be operated by the user, and a functional portion 124*b*, facing away from the operating portion 124*a* and configured to engage with the locking pawl arrangement 118. In this context, the shape of the functional portion 124*b* of the locking button 124 is configured such that, upon operating the locking button 124 into its operated position, the functional portion 124*b* interacts with a correspondingly shaped surface of the locking pawls 118*a* and 118*b*, respectively, so that the locking pawls 118*a* and 118*b* are moved away from each other, against the biasing force of the spring 120, to engage with the recesses 122*a* and 122*b*, respectively, of the first housing part 102*a*. Thus, after the locking button 124 has been operated in the above-described manner, the further locking mechanism 116 is in the locked state, so that the housing parts 102*a* and 102*b* are fixedly coupled to each other.

To ensure that the locking button 124 remains it its operated position and is not transferred back to its unoperated position by the force of the spring 120, the locking button comprises a locking button projection 124*c*, which interacts with a corresponding slide projection 126*a* of a slide 126 of the further locking mechanism 116, which slide 126 is translatable supported in the second housing part 102*b*.

To transfer the further locking mechanism 116 from its locked state into its unlocked state, the further locking mechanism 116 of this embodiment further comprises a release element in the form of a shape memory alloy wire 128, which is wrapped around the slide 126 and, at both ends 128*a* and 128*b*, connected to a chip unit 130. If the shape memory alloy wire 128 is transferred in its excited state, for example by supplying energy from the chip unit 130, which in turn may be connected to a battery or a similar energy supply device (not shown), the shape memory alloy wire contracts in such a way that the slide 126 is moved according to a direction, which substantially corresponds to direction R indicated by an arrow in FIG. 3. As a result, the slide projection 126*a* is being disengaged from the locking button projection 124*c*, so that the locking button 124 can be transferred again in its unoperated position, by the force induced by the spring 120, transferring the further locking mechanism 116 in its unlocked state. In other words, after transferring the locking button 124 from its operated position into its unoperated position by transferring the shape memory alloy wire 128 in its excited state, the locking pawls 118*a* and 118*b* of the locking pawl arrangement 118 are disengaged from the recesses 122*a* and 122*b* of the first housing part 102*a*, so that the first housing part 102*a* and the second housing part 102*b* can be separated from each other. After a separating movement of the first housing part 102*a* and the second housing part 102*b* by a small amount in a direction away from each other, a first teething 136 of the winding apparatus locking mechanism 114 and a second teething 138 of the winding apparatus 110, which are to be described below, are disengaged from each other, so that the rotational unwinding movement of the winding apparatus 110 is allowed.

To ensure that the slide 126, after an translation along the direction R induced by the shape memory alloy wire 128, can be transferred back to its unoperated position, the further locking mechanism 116 may further comprise a slide spring 132 (as shown in FIG. 2A), which on one side is supported by the slide 126 and on its other side by a locking mechanism receiving part 134 of the second housing part 102*b*, which locking mechanism receiving part 134 is configured to receive movable parts of the further locking mechanism 116 and the winding apparatus locking mechanism 114.

With respect to the last mentioned winding apparatus locking mechanism 114, it should be mentioned that according to the present embodiment, the winding apparatus locking mechanism 114 is configured so as to permit the rotational winding movement of the winding apparatus 110 even if the winding apparatus locking mechanism 114 is engaged with the winding apparatus 110. To achieve this function, the winding apparatus locking mechanism 114 comprises the first teething 136 that is configured to engage with the second teething 138, which corresponds to the first teething 136 and is fixedly coupled with the winding apparatus 110, as can be best seen from FIG. 2B for example. In this context, the first teething 136 may constitute a slip-through mechanism which is configured such that the first teething 136 is connected with the locking mechanism receiving part 134 via a teething biasing element in the form of a teething spring 140, which can be seen in FIG. 3, so that the rotational winding movement of the winding apparatus 110 is permitted, while preventing the rotational unwinding movement of the winding apparatus 110, if the winding apparatus locking mechanism 114 is engaged with the winding apparatus 110. It goes without saying that to achieve the last mentioned effect, likewise the teeth of the first teething 136 and the second teething 138, respectively, have to be configured with a suitable shape and/or orientation.

Finally, it should be mentioned that the anti-theft device 100 may further comprise an alarm generation apparatus configured to emit an acoustic and/or optical alarm signal in response to an attempt to remove the anti-theft device 100 from the merchandise to be protected without authorization. The alarm generation apparatus may be integrated in the chip unit 130.

Also integrated with said chip unit 130, the anti-theft device 100 may further comprise a signal-receiving unit that is configured to receive a release initiation signal, and a signal-transmitting unit, which is preferably configured to transmit a product information signal to a mobile terminal in response to a product information request operation.

It should be added that the anti-theft device 100 can further comprise an electronic article surveillance element (EAS element) (not shown in the Figures) which is configured to interact with an electronic article surveillance system (not shown either) such that when a customer attempts to remove protected merchandise to which the anti-theft device 100 is attached from a store, for example, without authorization, the alarm signal is output as soon as the merchandise passes a detector unit associated with the electronic article surveillance system.

The invention claimed is:

1. An anti-theft device configured to be attached to merchandise to be protected, the anti-theft device comprising:

a housing, which comprises a winding apparatus rotatably mounted therein;

at least one securing-loop arrangement, which comprises one or more securing loops, each having at least one securing cord connected to the winding apparatus, the at least one securing cord being windable onto the winding apparatus in response to a rotational winding movement of the winding apparatus, and being unwindable from the winding apparatus in response to a rotational unwinding movement of the winding apparatus, the securing-loop arrangement being designed to loop around the merchandise to be protected such that the anti-theft device can be securely connected to the merchandise to be protected;

a winding apparatus locking mechanism, which is engageable with the winding apparatus, the winding apparatus locking mechanism being configured to prevent the rotational unwinding movement of the winding apparatus in the housing, if the winding apparatus locking mechanism is engaged with the winding apparatus; and a further locking mechanism associated with the housing, the further locking mechanism having an unlocked state, in which the anti-theft device is detachable from the merchandise to be protected, and a locked state, in which the anti-theft device is fixedly connectable to the merchandise to be protected, wherein the further locking mechanism is operatively decoupled from the winding apparatus locking mechanism, wherein the housing comprises:

a first housing part receiving the winding apparatus; and a second housing part receiving the winding apparatus locking mechanism and the further locking mechanism, and wherein in the unlocked state of the further locking mechanism, the first and the second housing part are disengageable from each other, so that the anti-theft device is detachable from the merchandise to be protected, and in the locked state of the further locking mechanism, the first and the second housing part are not disengageable from each other, so that the anti-theft device is securely connectable to the merchandise to be protected.

2. The anti-theft device according to claim 1, wherein the further locking mechanism comprises a locking pawl arrangement including at least one locking pawl, which is configured to take a position, in which it engages with a corresponding recess formed in the first housing part, if the further locking mechanism is in the locked state.

3. The anti-theft device according to claim 2, wherein the locking pawl arrangement includes a pair of locking pawls facing away from each other, which are configured to take a position, in which they engage with a corresponding pair of recesses formed in the first housing part, if the further locking mechanism is in the locked state, wherein the pair of locking pawls is connected via a biasing element such that the pair of locking pawls is biased to a position corresponding to the unlocked state of the further locking mechanism.

4. The anti-theft device according to claim 2, wherein the at least one locking pawl has a shape corresponding or similar to a dovetail joint.

5. The anti-theft device according to claim 2, wherein the further locking mechanism comprises a locking button, which is configured to be operated by a user and to selectively take an operated position, which corresponds to the locked state of the further locking mechanism, and a non-operated position, which corresponds to the unlocked state of the further locking mechanism.

6. The anti-theft device according to claim 5, wherein the locking button has an operating portion, which is configured to be operated by a user, and a functional portion facing away from the operating portion and configured to engage with the locking pawl arrangement, such that the locking pawl arrangement is transferred to the position, which corresponds to the locked state of the further locking mechanism, if the locking button is in its operated position.

7. The anti-theft device according to claim 5, wherein the further locking mechanism further comprises a release element, which is made at least in part of a shape-memory alloy and is configured to cause the further locking mechanism to be transferred from the locked state to the unlocked state when the shape-memory alloy of the release element is in an excited state.

8. The anti-theft device according to claim 7, wherein the further locking mechanism comprises a slide, which is designed to be mounted translatable in the second housing part, wherein the slide is configured to be operatively connected to the release element as well as to the locking button, wherein the further locking mechanism is configured such that the locking button transitions from its operated position to its non-operated position, if the shape-memory alloy of the release element is in its excited state.

9. The anti-theft device according to claim 1, wherein the winding apparatus locking mechanism further comprises a first teething that is configured to be engaged with a second teething, which corresponds to the first teething and is fixedly coupled with the winding apparatus.

10. The anti-theft device according to claim 1, wherein the winding apparatus locking mechanism is further configured so as to permit the rotational winding movement of the winding apparatus, even if the winding apparatus locking mechanism is engaged with the winding apparatus.

11. The anti-theft device according to claim 1, wherein the anti-theft device further comprises an alarm generation apparatus configured to emit an acoustic and/or optical alarm signal in response to an attempt to remove the anti-theft device from the merchandise to be protected without authorization.

12. The anti-theft device according to claim 11, wherein the at least one securing cord of the securing-loop arrangement is made at least in part of an electrically conductive material and is operatively connected to the alarm generation apparatus.

13. The anti-theft device according to claim 1, wherein the anti-theft device further comprises a signal-receiving unit, the anti-theft device being configured to cause the further locking mechanism to be transferred to the unlocked state when the signal-receiving unit receives a release-initiation signal.

14. The anti-theft device according to claim 1, wherein the anti-theft device further comprises a signal-transmitting unit, which is configured to transmit a product information signal to a mobile terminal in response to a product-information request operation.

* * * * *